US012403824B2

United States Patent
Ueki (10) Patent No.: US 12,403,824 B2
(45) Date of Patent: Sep. 2, 2025

(54) ROAD SURFACE DRAWING CONTROL DEVICE

(71) Applicant: TOYOTA JIDOSHA KABUSHIKI KAISHA, Toyota (JP)

(72) Inventor: Nobukazu Ueki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 86 days.

(21) Appl. No.: 18/508,717

(22) Filed: Nov. 14, 2023

(65) Prior Publication Data

US 2024/0174169 A1 May 30, 2024

(30) Foreign Application Priority Data

Nov. 25, 2022 (JP) ................. 2022-188329

(51) Int. Cl.
*B60R 25/31* (2013.01)
*B60Q 1/50* (2006.01)
*B60Q 1/52* (2006.01)
*B60R 25/30* (2013.01)

(52) U.S. Cl.
CPC ............. *B60Q 1/543* (2022.05); *B60Q 1/52* (2013.01); *B60R 25/305* (2013.01); *B60R 25/31* (2013.01)

(58) Field of Classification Search
CPC .......... B60Q 1/543; B60Q 1/52; B60Q 1/482; B60Q 2400/40; B60Q 2400/50; B60R 25/305; B60R 25/31
See application file for complete search history.

(56) References Cited

U.S. PATENT DOCUMENTS

| 9,751,458 | B1* | 9/2017 | Dellock ............... B60Q 1/2696 |
| 10,065,555 | B2* | 9/2018 | Abrams ................ B60Q 1/323 |
| 10,176,368 | B1* | 1/2019 | Ramakrishnan ..... B60Q 1/2669 |
| 10,223,915 | B2* | 3/2019 | Haines ................. B60Q 1/324 |
| 10,759,329 | B2 | 9/2020 | Morimura et al. |
| 10,946,791 | B2 | 3/2021 | Morimura et al. |
| 11,260,789 | B2 | 3/2022 | Morimura et al. |
| 2007/0030136 | A1* | 2/2007 | Teshima ................ B60Q 3/80 340/458 |

(Continued)

FOREIGN PATENT DOCUMENTS

| JP | 2006-130937 A | 5/2006 |
| JP | 2020-100327 A | 7/2020 |

*Primary Examiner* — Nay Tun
(74) *Attorney, Agent, or Firm* — Sughrue Mion, PLLC (57) ABSTRACT

A road surface drawing control device for a vehicle that comprises a target information acquisition device that acquires information on targets around the vehicle; a communication device that communicates with a keyless entry terminal device operated by a user of the vehicle; a road surface drawing device that draws a road surface around the vehicle; a road surface drawing ECU that controls the operation of the road surface drawing device, and when the road surface drawing ECU determines that the user of the vehicle is within a reference distance from the vehicle based on the target information acquired by the target information acquisition device or that the keyless entry terminal device has been operated based on the communication between the communication device and the keyless entry terminal device, the road surface drawing device is activated to draw the road surface.

4 Claims, 6 Drawing Sheets

(56) References Cited

U.S. PATENT DOCUMENTS

| | | | | |
|---|---|---|---|---|
| 2008/0296926 A1* | 12/2008 | Hanzel | .............. | H03K 17/941 |
| | | | | 704/251 |
| 2014/0198515 A1* | 7/2014 | Tulio | .................. | B60R 1/1207 |
| | | | | 362/520 |
| 2015/0298598 A1* | 10/2015 | Nüssli | ................ | H04N 9/3147 |
| | | | | 345/2.2 |
| 2015/0353000 A1* | 12/2015 | Kowatzki | ............. | B60Q 1/247 |
| | | | | 315/77 |
| 2017/0130510 A1* | 5/2017 | Nania | .................... | E05B 81/78 |
| 2017/0246985 A1* | 8/2017 | Dellock | ................ | B60Q 1/302 |
| 2018/0065537 A1* | 3/2018 | Abrams | ................ | H05B 47/19 |
| 2018/0186283 A1* | 7/2018 | Fischer | ................ | G07C 5/008 |
| 2018/0272992 A1* | 9/2018 | Gage | .................... | G06V 20/56 |
| 2019/0048646 A1* | 2/2019 | Tachibana | ............... | E05F 15/77 |
| 2019/0164344 A1* | 5/2019 | Potter | .................... | B60Q 1/507 |
| 2020/0150702 A1 | 5/2020 | Ueda | | |
| 2020/0207258 A1* | 7/2020 | Tezuka | ................ | F21S 41/143 |
| 2023/0415640 A1* | 12/2023 | Baker | .................... | B60Q 1/30 |

\* cited by examiner

ROAD SURFACE DRAWING CONTROL DEVICE

CROSS-REFERENCE TO RELATED APPLICATION

This application claims priority to Japanese Patent Application No. JP2022-188329 filed on Nov. 25, 2022, the content of which is hereby incorporated by reference in its entirety into this application.

BACKGROUND

1. Technical Field

The present disclosure relates to a road surface drawing control device for a vehicle such as an automobile.

2. Description of the Related Art

It is known to search for an own vehicle by operating a remote terminal device such as a remote entry key and flashing hazard lamps in the event that a user has forgotten a parking position of the own vehicle in a large parking lot such as a shopping mall parking lot. For example, an example of a hazard lamp lighting device in which hazard lamps are flashed by operating a remote terminal device is described in Japanese Patent Application Laid-open No. 2006-130937.

However, if hazard lamps are shielded by other vehicles or structures in a parking lot, the own vehicle cannot be discovered even if the hazard lamps are flashed. It is also conceivable to activate a buzzer or the like by operating a remote terminal device, but there is also an effect of reverberation, etc., and it is not easy to identify the vehicle in which the buzzer sound is generated.

SUMMARY

The present disclosure provides a road surface drawing control device that can increase a possibility that a user finds his or her own vehicle by using road surface drawing around the vehicle by a road surface drawing device.

According to the present disclosure, there is provided a road surface drawing control device for a vehicle comprising: a target information acquisition device that acquires information of targets around a vehicle; a communication device that communicates with a remote operation terminal device that is operated by a user of the vehicle; a road surface drawing device that draws a road surface around the vehicle; and an electronic control unit that controls the operation of the road surface drawing device.

The electronic control unit is configured to operate the road surface drawing device to draw the road surface in at least one of a situation where it is determined that the user of the vehicle is within a range of a reference distance from the vehicle and a situation where it is determined that the remote operation terminal device is operated by communication between the communication device and the remote operation terminal device, based on at least one of information of targets acquired by the target information acquisition device and communication between the communication device and the remote operation terminal device.

According to the above-described configuration, when the user of the vehicle is determined to be within the range of the reference distance from the vehicle, or when it is determined that the remote operation terminal device is operated, the road surface drawing device is operated and the road surface drawing is performed. Since the road surface drawing is performed around the vehicle, for example, even if the hazard lamps are shielded by other vehicles or structures in a parking lot, if characters or symbols of the road surface drawing are not shielded, the user can identify own vehicle by finding them. Therefore, it is possible to increase a possibility that the user discovers the own vehicle.

In another aspect of the disclosure, the electronic control unit is configured to operate a road surface drawing device to draw a road surface and operate hazard lamps of the vehicle, wherein the road surface drawing device includes at least one drawing unit that irradiates light of the road surface drawing, and the drawing unit is provided at a position different from the hazard lamps when viewed from above the vehicle.

In another aspect of the present disclosure, the electronic control unit is configured to operate the road surface drawing device to draw a road surface when it is determined that the user of the vehicle is searching for the vehicle on the basis of at least one of the information of targets acquired by the target information acquisition device and the communication between the communication device and the remote operation terminal device.

Further, in another aspect of the present disclosure, the road surface drawing device includes a plurality of drawing units that irradiate light of the road surface drawing in directions different from each other around the vehicle, and the electronic control unit is configured to determine a direction of the user of the vehicle with respect to the vehicle based on at least one of information of the targets acquired by the target information acquisition device and the communication between the communication device and the remote operation terminal device, and to determine a drawing unit to be operated based on the determined direction.

Further, in another aspect of the present disclosure, the electronic control unit is configured to change recognizability of the road surface drawing according to at least one of a distance between the user of the vehicle and the vehicle, brightness around the vehicle and the number of operations on the remote operation terminal device such that the recognizability of the road surface drawing becomes higher as the distance between the user of the vehicle and the vehicle is larger, the recognizability of the road surface drawing becomes higher as the brightness around the vehicle is higher, and the recognizability of the road surface drawing becomes higher as the number of operations on the remote operation terminal device is larger.

Other objects, other features and attendant advantages of the present disclosure will be readily understood from the description of embodiments of the disclosure described with reference to the following drawings.

DETAILED DESCRIPTION

It will be described in detail below a road surface drawing control device according to embodiments of the present disclosure with reference to the accompanying drawings.

Figure 1:
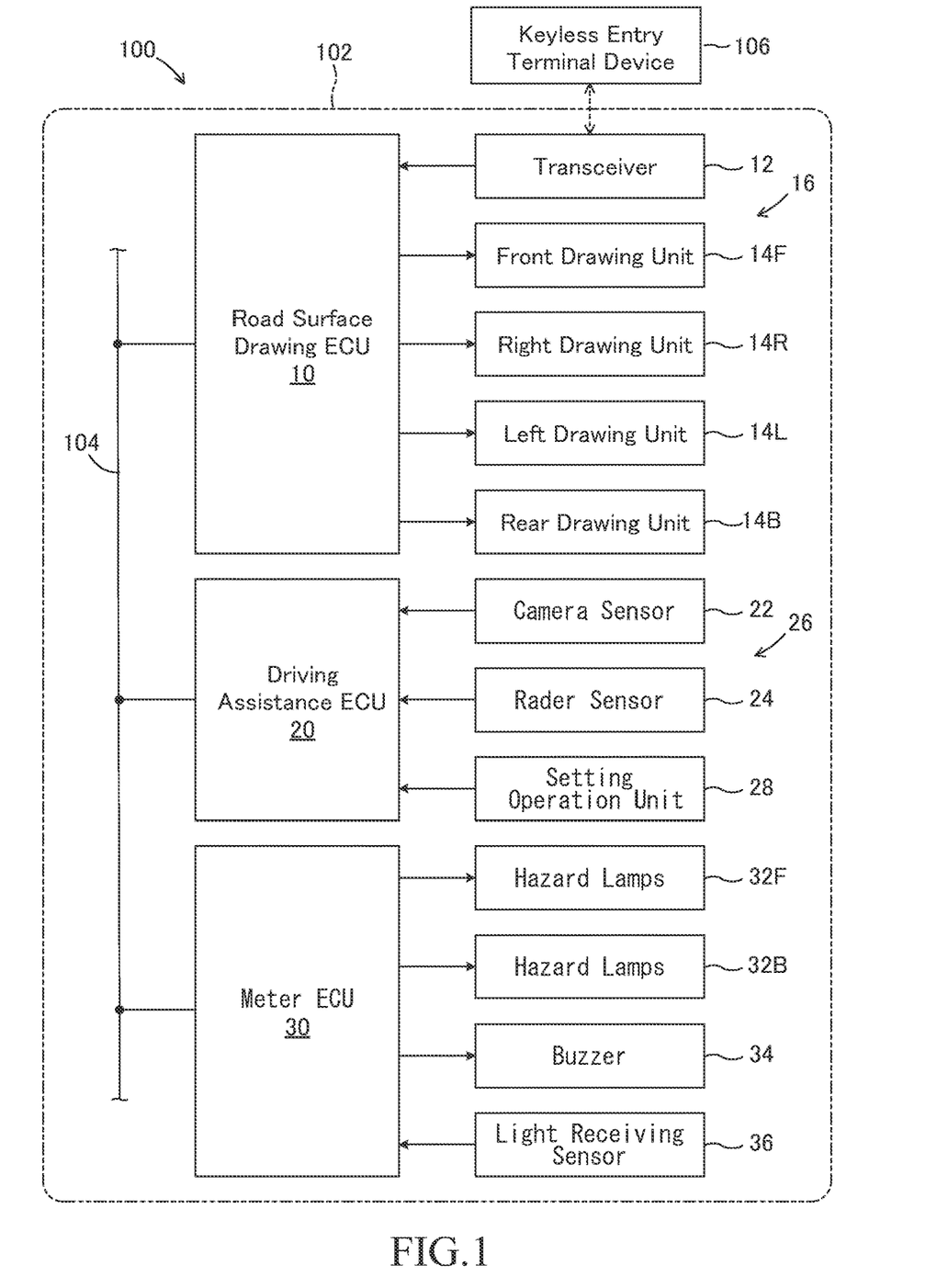
FIG. 1 is a schematic configuration diagram showing an embodiment of a road surface drawing control device according to the present disclosure.

As shown in FIG. 1, a road surface drawing controller 100 according to an embodiment of the present disclosure is applied to a vehicle 102 and includes a road surface drawing ECU 10. The vehicle 102 includes a driving assistance ECU 20 and a meter ECU 30. ECU means an electronic controller unit comprising a microcomputer as its main part.

The microcomputer of each ECU includes a CPU, a ROM, a RAM, readable and writable non-volatile memories (N/M), interfaces (I/F), and the like. The CPU realizes various functions by executing instructions (programs and routines) stored in the ROM. Furthermore, these ECU are connected to each other data-interchangeable (communicating) via a CAN (Controller Area Network) 104. Thus, information acquired by sensors (including switches) connected to a particular ECU may be transmitted to other ECUs.

The road surface drawing ECU 10 are connected with a transceiver 12 that wirelessly communicates with a keyless entry terminal device 106, a front drawing unit 14F, a right drawing unit 14R, a left drawing unit 14L and a rear drawing unit 14B. The road surface drawing ECU 10 and the drawing units 14F, 14R, 14L and 14B function as a road surface drawing device 16 that draws a road surface around the vehicle 102. The transceiver 12 operates even in a situation where an ignition switch (not shown) is off. When the transceiver 12 receives a signal wirelessly transmitted from the keyless entry terminal device 106, the transceiver turns on the ignition switch so as to activate ECUs such as the road surface drawing ECU 10. The drawing units 14F, 14R, 14L and 14B are collectively referred to as a drawing unit 14.

The keyless entry terminal device 106 includes a locking switch and an unlocking switch and transmits a locking signal and an unlocking signal, respectively when the locking switch and the unlocking switch is operated by a user. When the locking signal and the unlocking signal transmitted from the keyless entry terminal device 106 is received by the transceiver 12, their signals are transmitted to a vehicle body ECU not shown in FIG. 1 via the road surface drawing ECU 10, and the vehicle body ECU performs locking and unlocking of doors, not shown.

The road surface drawing ECU 10 controls operation of the drawing unit 14. In particular, when the transceiver 12 receives the locking signal and the unlocking signal from the keyless entry terminal device 106, as will be described in detail later, the road surface drawing ECU 10 controls the operation of the drawing units 14F, 14R, 14L and 14B. Furthermore, when the transceiver 12 receives the locking signal and the unlocking signal from the keyless entry terminal device 106, the road surface drawing ECU 10 estimates a distance L between the user and the vehicle 102 based on a strength of the signal.

Figure 6:
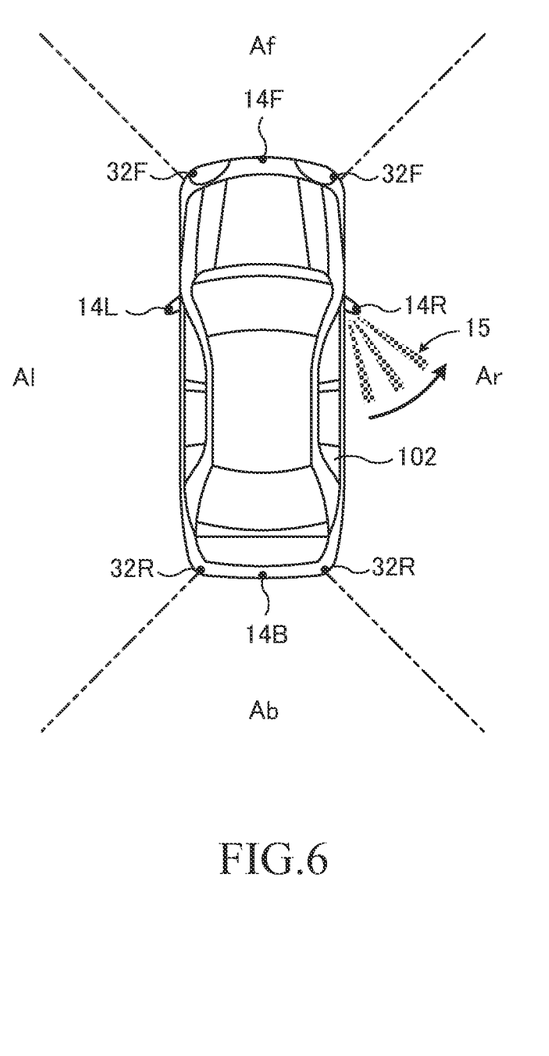
FIG. 6 is a diagram illustrating a procedure of determining a drawing unit to be activated.

Although not shown in FIG. 1, each drawing unit, as is well known, includes a light source device for drawing, and by the light source device being controlled by the road surface drawing ECU 10, irradiates light of the road surface drawing on a road surface around the vehicle 102 to draw images such as characters and symbols. As shown in FIG. 6, the front drawing unit 14F is provided at a front end of the vehicle 102 to draw information of changes in a traveling direction of the vehicle, and the like on the road surface in front of the vehicle by irradiating light to the front of the vehicle. The right drawing unit 14R and the left drawing unit 14L are provided on right and left door mirrors of the vehicle 102, respectively, and draw notice information about door opening on the right and left road surfaces of the vehicle by irradiating light to the sides of the vehicle. The rear drawing unit 14B is provided at a rear end of the vehicle 102, and draws information such as information of vehicle backward on a road surface behind the vehicle by irradiating light to the rear of the vehicle.

The driving assistance ECU 20 is a central control unit which carries out driving assistance control such as lane departure prevention control and following-up inter-vehicle distance control. In the embodiment, the driving assistance ECU 20 provides the road surface drawing ECU 10 with information required for controlling the operation of the front drawing unit 14F and the like, as will be more fully described later.

A camera sensor 22 and a radar sensor 24 are connected to the driving assistance ECU 20. The camera sensor 22 includes four camera sensors that capture front, rear, right and left sides, but is not limited to four. The radar sensor 24 includes five radar sensors that acquire target information of a three-dimensional object present in the front area, the right front area, the left front area, the right rear area, and the left rear area, but is not limited to five. The camera sensor 22 and the radar sensor 24 function as a target information acquisition device 26 that acquires target information around the own vehicle 102.

In the embodiment, when the unlocking switch of the keyless entry terminal device 106 is operated, in a situation where the ignition switch is off, the driving assistance ECU 20 and the like are activated, the camera sensor 22 starts capturing around the vehicle 102. In place of the radar sensor 24, or in addition to the radar sensor 24, LiDAR (Light Detection And Ranging) may be used.

Furthermore, the driving assistance ECU 20 is connected with a setting operation unit 28. The setting operation unit 28 is provided in a position to be operated by a driver. Although not shown in FIG. 1, the setting operation unit 28 includes various switches necessary for driving assistance control.

In the embodiment, an image of an upper body of the user captured by a vehicle interior camera, which is not shown in FIG. 1, an image of the upper body of the user and a moving image of the walking user captured by a camera of a smartphone and the like are stored in a storage device of the driving assistance ECU 20. The CPU of the driving assistance ECU 20 determines whether or not a person around the vehicle 102 captured by the camera sensor 22 is the user based on the images stored in the storage device. The CPU of the driving assistance ECU 20 determines whether or not a person around the vehicle 102 captured by the camera sensor 22 is the user by gait determined based on the moving image stored in the storage device. Furthermore, the CPU of the driving assistance ECU 20, when it is determined that the person captured by the camera sensor 22 is the user, estimates a distance L between the user and the vehicle 102 based on the images captured by the camera sensor 22.

The meter ECU 30 is connected with left and right hazard lamps 32F on the front side of the vehicle, left and right hazard lamps 32B on the rear side of the vehicle, a buzzer 34 and a light receiving sensor 36 of an auto light. When the unlocking switch of the keyless entry terminal device 106 is operated, the hazard lamps 32F and 32B perform answerback by blinking for a preset time. As shown in FIG. 6, the front left and right hazard lamps 32F are provided on left and right corners of the front end of the vehicle 102, the rear left and right hazard lamps 32B are provided on left and right corners of the rear end of the vehicle 102. Therefore, the drawing units 14F, 14R, 14L and 14B are provided at positions that differ from the positions of the hazard lamps 32F and 32B when viewed from above. However, the drawing unit 14 may include a drawing unit provided at the same position as the hazard ramp 32F or 32B.

The buzzer 34 sounds when calling attention to an occupant or occupants of the vehicle, and sounds as needed when road surface drawing is performed by the front side drawing unit 14F or the like. The sounding sound of the buzzer 34 is also perceivable by persons outside the vehicle 102. The light receiving sensor 36 is disposed in the vicinity of a windshield (not shown) in a vehicle interior of the vehicle 102, detects an amount of light Q as an indicator of brightness outside the vehicle.

First Embodiment

Figure 2:
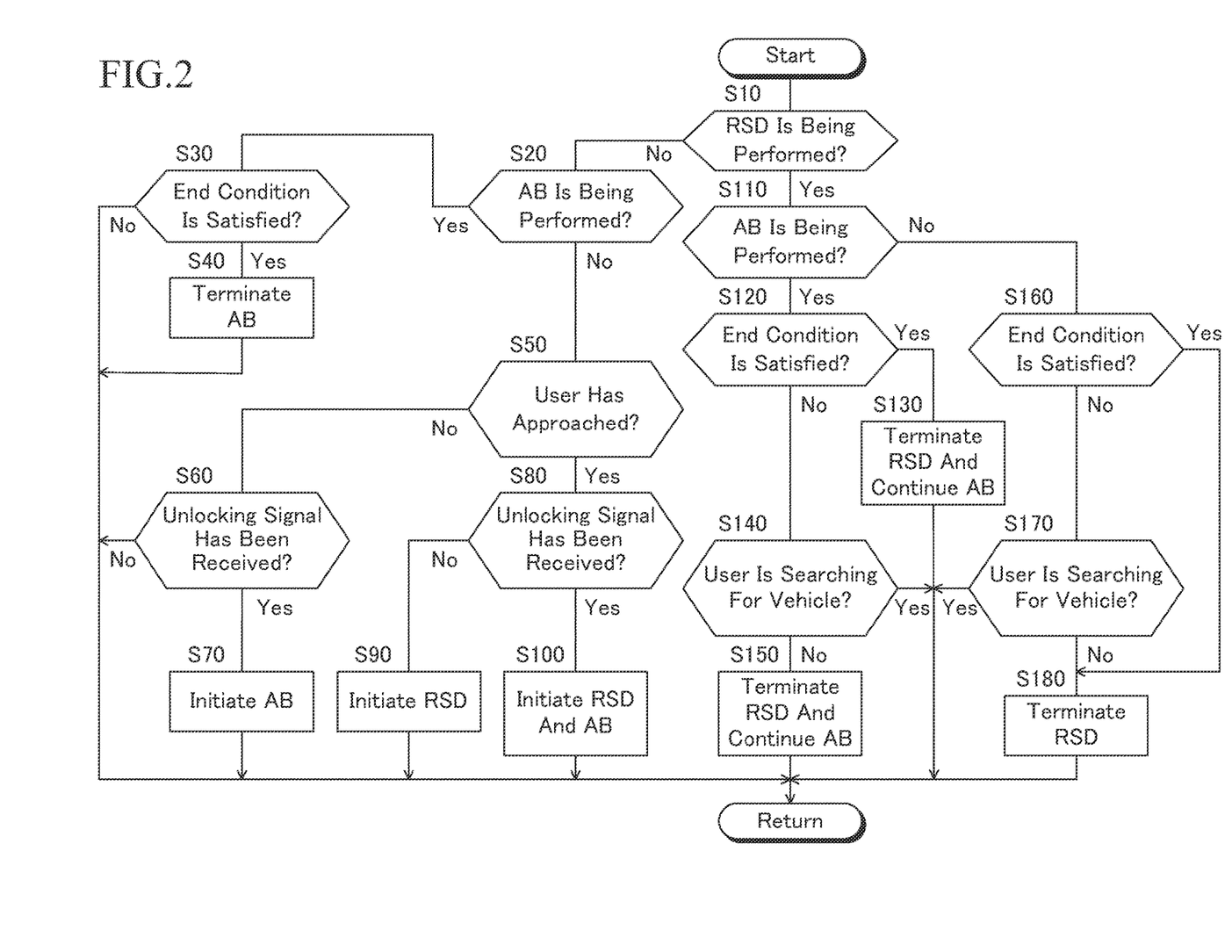
FIG. 2 is a flowchart illustrating a routine of the road surface drawing control in the first embodiment.

In the first embodiment, the ROM of the road surface drawing ECU 10 stores a program of the road surface drawing control corresponding to the flowchart shown in FIG. 2. The CPU of the road surface drawing ECU 10 is activated when the transceiver 12 receives a signal that is wirelessly transmitted from the keyless entry terminal device 106, and executes the road surface drawing control according to the program. Incidentally, when it is determined that the vehicle 102 is parked in a place such as a large parking lot, for example, by a navigation device (not shown), the ECUs such as the road surface drawing ECU 10 are energized at each predetermined time, and the road surface drawing control is executed for a preset duration. The same goes in other embodiments described later.
<Road Surface Drawing Control Routine in the First Embodiment>

Next, a routine of the road surface drawing control in the first embodiment will be described with reference to the flowchart shown in FIG. 2. In the following description, the road surface drawing control is simply referred to as "the present control". Incidentally, in FIG. 2 and FIGS. 3 to 5 described later, the road surface drawing is denoted as RSD, and the answerback is denoted as AB.

First, in step S10, the CPU determines whether or not the road surface drawing is being performed. When an affirmative determination is made, the present control proceeds to step S110, and when a negative determination is made, the present control proceeds to step S20.

In step S20, the CPU determines whether or not an answerback is being performed, that is, whether or not the hazard lamps 32F and 32B are blinking. When a negative determination is made, the present control proceeds to step S50, and when an affirmative determination is made, the present control proceeds to step S30.

In step S30, the CPU determines whether or not an end condition of the answerback is satisfied. When a negative determination is made, the present control temporarily ends, and when an affirmative determination is made, the present control proceeds to step S40. For example, when any one of the following conditions X1 to X3 is determined to be satisfied, it may be determined that the end condition of the answerback is satisfied.

(X1) Time more than a reference elapsed time (a positive constant) has elapsed since the answerback was started in step S70.
(X2) The user has moved within a reference end distance (a positive constant) from the vehicle 102.

(X3) One of doors of the vehicle 102 is opened.

In step S40, the CPU terminates the answerback to a user's unlock request. Even when the answerback is terminated, the doors of the vehicle 102 are maintained in an unlocked state.

In step S50, the CPU determines whether or not the user has approached the vehicle within a reference approach distance (a positive constant greater than the reference end distance) based on a distance L between the user and the vehicle 102 estimated by the CPU and the CPU of the driving assistance ECU 20. When an affirmative determination is made, the present control proceeds to step S80 and when a negative determination is made, the present control proceeds to step S60.

In step S60, the CPU determines whether or not the transceiver 12 has received the unlocking signal transmitted from the keyless entry terminal device 106. When a negative determination is made, the present control temporarily ends, and when an affirmative determination is made, the present control proceeds to step S70. Alternatively, when an affirmative determination is made, the present control may proceed to step S100.

In step S70, the CPU issues an answerback command to the meter ECU 30. Upon receipt of an answerback command, the meter ECU 30 initiates an answerback to the user's unlock request by initiating flashing of front and rear hazard lamps 32F and 32B.

In step S80, the CPU, as in step S60, determines whether or not the transceiver 12 has received the unlocking signal transmitted from the keyless entry terminal device 106. When an affirmative determination is made, the present control proceeds to step S100, and when a negative determination is made, the present control proceeds to step S90. Incidentally, when a negative determination is made, it may be determined whether or not the user is searching for the vehicle 102 in the same manner as in step S170 described below, and when an affirmative determination is made, the present control may proceeds to step S90, and when a negative determination is made, the present control may once end.

In step S90, the CPU initiates the road surface drawing by the drawing unit to a surrounding area of the vehicle 102 by initiating outputting of control signal to the drawing units 14F, 14R, 14L and 14B.

In step S100, the CPU initiates the road surface drawing to the surrounding area of the vehicle 102 by the drawing units 14F, 14R, 14L and 14B as in step S90, and also initiates the answerback to the user's unlock request as in step S70. Incidentally, in steps S70 and S100, the doors of the vehicle 102 are unlocked. In addition, when there is an object such as a wall, another vehicle, or a traffic participant, which is an obstacle to the road surface drawing, the road surface drawing on the side of the object or the traffic participant may not be performed.

In step S110, the CPU determines whether or not the answerback is being performed. When a negative determination is made, the present control proceeds to step S160, and when an affirmative determination is made, the present control proceeds to step S120.

In step S120, the CPU determines whether or not end conditions of the road surface drawing and the answerback are satisfied. When a negative determination is made, the present control proceeds to step S140, and when an affirmative determination is made, the present control proceeds to step S130. For example, when any one of the following conditions Y1 to Y3 is determined to be satisfied, it may be determined that the end conditions of the road surface drawing and the answerback are satisfied.

(Y1) Time more than a standard elapsed time has elapsed since the road surface drawing and the answerback are initiated in step S100. The reference elapsed time for the road surface drawing may be longer than the reference elapsed time for the answerback.

(Y2) The user has moved to within the reference end distance from the vehicle 102.

(Y3) One of the doors of the vehicle 102 is opened.

In step S130, the CPU terminates the road surface drawing around the vehicle 102 by the drawing units 14F, 14R, 14L and 14B and terminates the answerback to the user's unlock request. Even when the answerback is terminated, the doors of the vehicle 102 are maintained in the unlocked state.

In step S140, the CPU determines whether or not the user is searching for the vehicle 102. When an affirmative determination is made, the present control once ends, and when a negative determination is made, the present control proceeds to step S150. If, for example, it is determined that a person who is determined to be the user by the CPU of the driving assistance ECU 20 is changing a direction of a line of sight without moving or is moving without directly approaching the vehicle 102, it may be determined that the user is searching for the vehicle 102.

In step S150, the CPU terminates the road surface drawing around the vehicle 102 by the drawing units 14F, 14R, 14L and 14B, but continues an answerback to the user's unlock request.

In step S160, the CPU determines whether or not the end condition of the road surface drawing is satisfied. When an affirmative determination is made, the present control proceeds to step S180, and when a negative determination is made, the present control proceeds to step S170. For example, when any one of the following conditions Z1 to Z3 is determined to be satisfied, it may be determined that the end condition of the road surface drawing is satisfied.

(Z1) Time more than the standard elapsed time has elapsed since the road surface drawing is initiated in step S90.

(Z2) The user has moved to within the reference end distance from the vehicle 102.

(Z3) One of the doors of the vehicle 102 is opened.

In step S170, the CPU determines whether or not the user is searching for the vehicle 102, as in step S140. When an affirmative determination is made, the present control once ends, and when a negative determination is made, the present control proceeds to step S180.

In step S180, the CPU terminates the road surface drawing around the vehicle 102 by the drawing units 14F, 14R, 14L and 14B.

Second Embodiment

Figure 3:
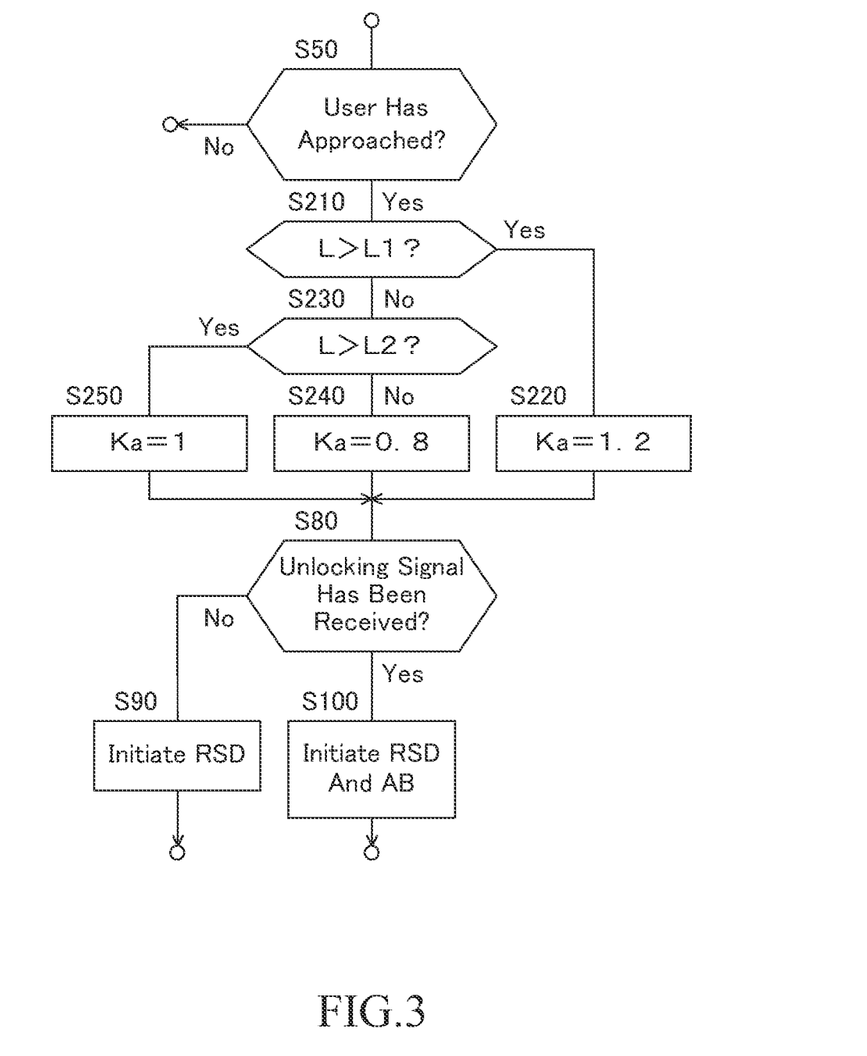
FIG. 3 is a flowchart showing a main part of a routine of the road surface drawing control in the second embodiment.

FIG. 3 is a flowchart showing a main part of a routine of the road surface drawing control in the second embodiment. In the second embodiment, steps other than steps S210 to S250 are performed in the same manner as in the first embodiment. As illustrated in FIG. 3, however, when an affirmative determination is made in the step S50, the present control proceeds to step S210.

In step S210, the CPU determines whether or not the distance L between the user and the vehicle 102 is greater than a first reference distance L1 (a positive constant). When a negative determination is made, the present control proceeds to step S230 and when an affirmative determination is made, a correction coefficient Ka for correcting illuminance of the light source device of the drawing unit 14 is set to 1.2 in the step S220.

In step S230, the CPU determines whether or not the distance L between the user and the vehicle 102 is greater than a second reference distance L2 (a positive constant that is less than the first reference distance L1). When a negative determination is made, the correction coefficient Ka is set to 0.8 in step S240, and when an affirmative determination is made, the correction coefficient Ka is set to 1 in step S250.

In steps S90 and S100, the illuminance of the light source device of the drawing unit 14 when the road surface drawing to the surrounding area of the vehicle 102 is started is corrected to the correction coefficient Ka times. Notably, so long as the correction coefficient Ka set in step S220 is larger than the correction coefficient Ka set in step S250, and the correction coefficient Ka set in step S240 is smaller than the correction coefficient Ka set in step S250, the correction coefficient Ka may not be the above-described value.

Third Embodiment

Figure 4:
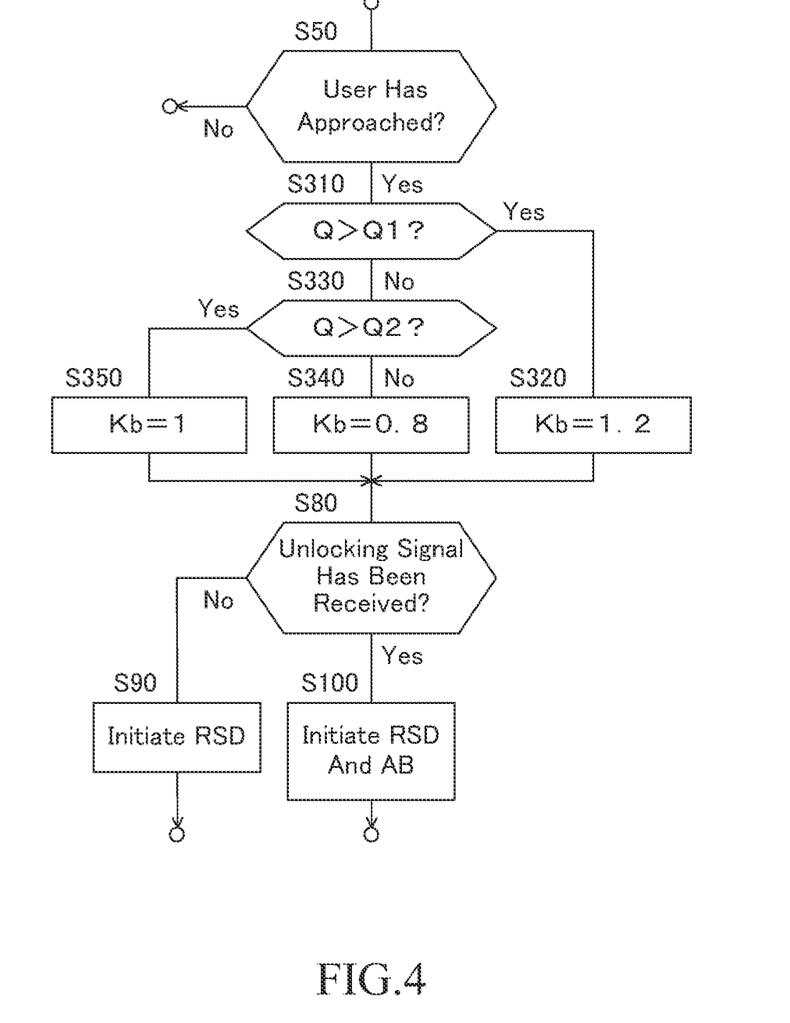
FIG. 4 is a flowchart showing a main part of a routine of the road surface drawing control in the third embodiment.

FIG. 4 is a flowchart showing a main part of a routine of the road surface drawing control in the third embodiment. In the third embodiment, steps other than steps S310 to S350 are performed in the same manner as in the first embodiment. As illustrated in FIG. 4, when an affirmative determination is made in step S50, the present control proceeds to step S310.

In step S310, the CPU determines whether or not the light amount Q detected by the light receiving sensor 36 is greater than a first reference distance Q1 (a positive constant). When a negative determination is made, the present control proceeds to step S330, and when an affirmative determination is made, a correction coefficient Kb for correcting the illuminance of the light source device of the drawing unit 14 is set to 1.2 in step S320.

In step S330, the CPU determines whether or not the light amount Q detected by the light receiving sensor 36 is greater than a second reference distance Q2 (a positive constant smaller than the first reference distance Q1). When a negative determination is made, the correction coefficient Kb is set to 0.8 in step S340, and when an affirmative determination is made, the correction coefficient Kb is set to 1 in step S350.

In steps S90 and S100, the illuminance of the light source device of the drawing unit 14 when the road surface drawing to the surrounding area of the vehicle 102 is initiated is corrected to the correction coefficient Kb times. Notably, so long as the correction coefficient Kb set in step S320 is larger than the correction coefficient Kb set in step S350, and the correction coefficient Kb set in step S340 is smaller than the correction coefficient Kb set in step S350, the correction coefficient Kb may not be the above-described value.

Fourth Embodiment

Figure 5:
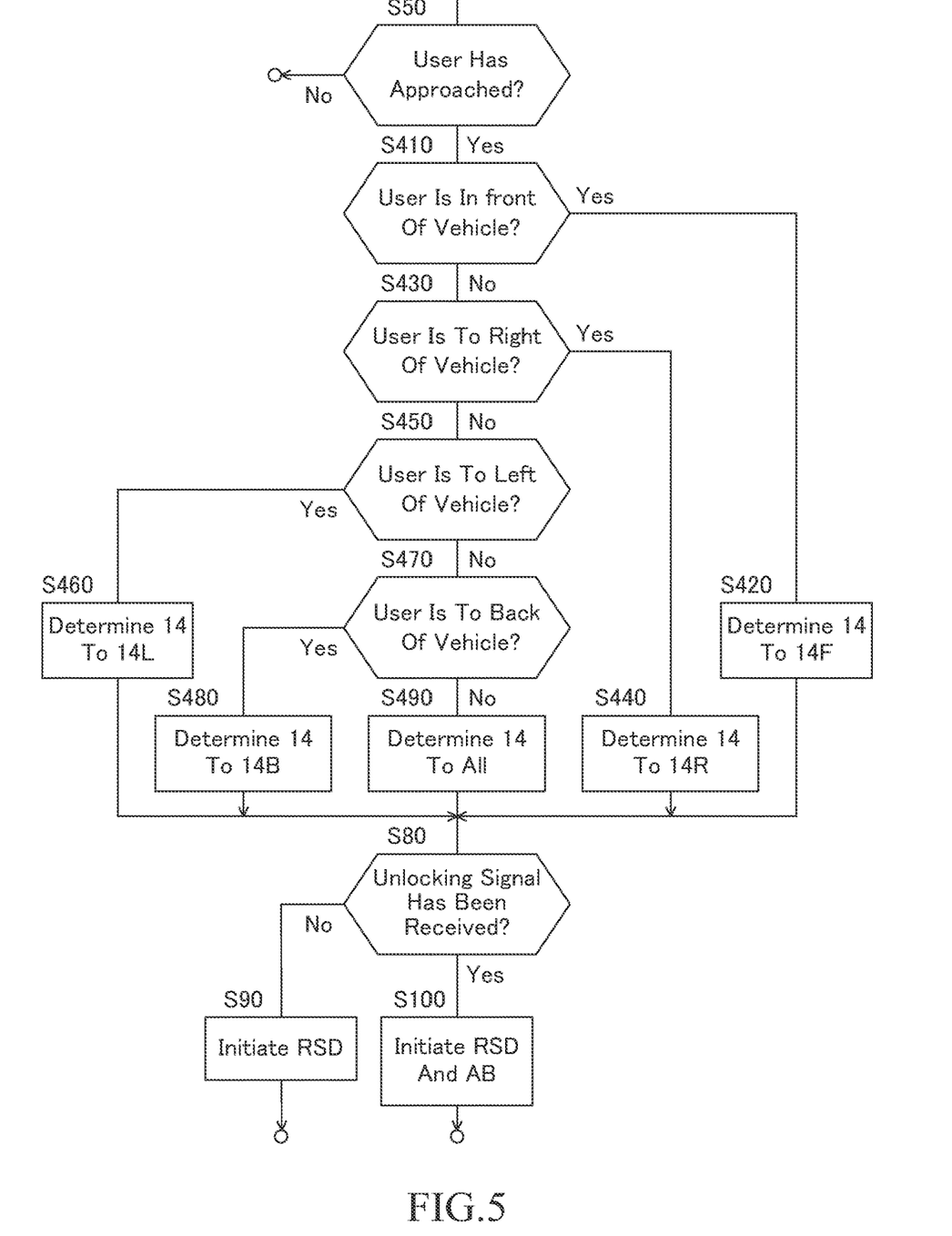
FIG. 5 is a flowchart showing a main part of a routine of the road surface drawing control in the fourth embodiment.

FIG. 5 is a flowchart showing a main part of a routine of the road surface drawing control in the fourth embodiment. In the fourth embodiment, steps other than steps S410 to S490 are performed in the same manner as in the first embodiment. As illustrated in FIG. 5, when an affirmative determination is made in step S50, the present control proceeds to step S410.

In step S410, the CPU determines whether or not the user is in front of the vehicle 102, for example, by determining whether or not the user is in a region Af illustrated in FIG.

6. When a negative determination is made, the present control proceeds to step S430 and when an affirmative determination is made, the drawing unit 14 to be activated is determined to the front drawing unit 14F in step S420.

In step S430, the CPU determines whether or not the user is to the right of the vehicle 102, for example, by determining whether or not the user is in a region Ar shown in FIG. 6. When a negative determination is made, the present control proceeds to step S450, and when an affirmative determination is made, the drawing unit 14 to be activated is determined to the right drawing unit 14R in the step S440. In FIG. 6, reference numeral 15 denotes a road surface drawing by the side drawing unit 14R. The road surface drawing 15 is a drawing that announces that a door of the driver's seat opens, and moves in a direction away from the vehicle intermittently, as a symbol of the door is indicated by an arrow.

In step S450, the CPU determines whether or not the user is on the left side of the vehicle 102, for example, by determining whether or not the user is in a region Al shown in FIG. 6. When a negative determination is made, the present control proceeds to step S470, and when an affirmative determination is made, the drawing unit 14 to be activated is determined to the left drawing unit 14L in step S460.

In step S470, the CPU determines whether or not the user is to the back of the vehicle 102, for example, by determining whether or not the user is in a region Ab illustrated in FIG. 6. When an affirmative determination is made, the drawing unit 14 to be activated is determined to the rear drawing unit 14B in step S480, and when a negative determination is made, the drawing unit 14 to be activated is determined to all of the drawing units 14F, 14R, 14L and 14B in step S490.

As can be seen from the above explanation, according to the embodiments, in a situation in which neither road surface drawing nor answerback is performed (S10, S20), when it is determined that the user has approached within the range of the reference approach distance from the vehicle 102 (S50), the road surface drawing is started (S90, S100). Then, the road surface drawing is continued until it is determined that the end condition of the road surface drawing is satisfied (S160). Since the road surface drawing is performed around the vehicle, for example, even if the hazard lamps are shielded by other vehicles or structures in a parking lot, if the road surface drawing is not shielded, the user can identify the own vehicle 102 by finding the road surface drawing. Therefore, as compared to where the road surface drawing is not performed, it is possible to increase the possibility that the user finds the own vehicle.

Further, according to the embodiments, when it is determined that the user has approached within the range of the reference approach distance from the vehicle 102 (S50) and received the unlocking signal transmitted from the keyless entry terminal device 106 (S80), the road surface drawing and answerback are initiated (S100). Then, the road surface drawing and the answerback are continued until it is determined that the end condition of the road surface drawing is satisfied (S120). Therefore, as compared to where only the road surface drawing is performed, it is possible to increase the possibility that the user finds the own vehicle 102.

In particular, according to the second embodiment, when the distance L between the user and the vehicle 102 is large, the illuminance of the light source device of the drawing unit 14 is increased, and when the distance L is small, the illuminance of the light source device is lowered. That is, the recognizability of the road surface drawing is changed according to the distance L. Therefore, as compared to where the illuminance of the light source device is constant regardless of the distance L, when the user is in a position far from the vehicle, it is easy for the user to notice the road surface drawing, and when the user is in a position close to the vehicle, an energy consumption by the road surface drawing can be reduced.

Further, according to the third embodiment, when the brightness outside the vehicle is high, the illuminance of the light source device of the drawing unit 14 is increased, and when the brightness outside the vehicle is low, the illuminance of the light source device is lowered. That is, the recognizability of the road surface drawing is changed according to the brightness outside the vehicle. Therefore, as compared to where the illuminance of the light source device is constant regardless of the brightness outside the vehicle, when the brightness outside the vehicle is high, the user can easily notice the road surface drawing, and when the brightness outside the vehicle is low, the energy consumption by the road surface drawing can be reduced.

Further, according to a fourth embodiment, a direction of the user with respect to the vehicle 102 is determined, and a drawing unit to be activated is determined based on the determined direction. That is, the drawing unit 14 on the user's side with respect to the vehicle 102 is activated, and the other drawing units are not activated. Therefore, it is possible to reduce the energy consumed by the road surface drawing as compared to where all the drawing units 14F, 14R, 14L and 14B are always activated while ensuring a situation in which the user is easily aware of the road surface drawing.

Incidentally, when the drawing unit 14 on the side where an object such as a wall, another vehicle, or a traffic participant exists is not activated, which becomes an obstacle to the road surface drawing, it is possible to prevent the wasteful road surface drawing from being performed and prevent the road surface drawing from adversely affecting the traffic participant.

While the present disclosure has been described in detail with reference to specific embodiments, it will be apparent to those skilled in the art that the present disclosure is not limited to the embodiments described above, and various other embodiments are possible within the scope of the present disclosure.

For example, the reference elapsed time in step S120 and S160 may be constant, but it may be variably set so that the longer the number of times the keyless entry terminal device 106 is operated prior to an affirmative determination is made in step S120 and S160. Further, the more the number of times the keyless entry terminal device 106 is operated, the illuminance of the light source device may be increased. The longer the reference elapsed time and the higher the illuminance of the light source device, the higher the recognizability of the road surface drawing. Furthermore, the number of actuated devices such as a buzzer 34, headlights (not shown) may be increased.

Further, in the above embodiments, although the remote operation terminal device is a keyless entry terminal device 106, it may be a smartphone capable of communicating with the transceiver 12 by Bluetooth (registered trademark) or the Internet.

Further, although the second to fourth embodiments described above are mutually independent, the embodiments may be implemented in any combination. In particular, when the second and third embodiments are combined and implemented, in steps S90 and S100, the illuminance of the light source device of the drawing unit 14 is corrected to a Ka×Kb times.

What is claimed is:

1. A road surface drawing control device for a vehicle comprising: a target information acquisition device that acquires information of targets around a vehicle; a communication device that communicates with a remote operation terminal device that is operated by a user of the vehicle; a road surface drawing device that draws a road surface around the vehicle; and an electronic control unit that controls operation of the road surface drawing device, the electronic control unit is configured to operate the road surface drawing device to draw the road surface in at least one of a situation where the electronic control unit determines that the user of the vehicle is within a range of a reference distance from the vehicle and a situation where the electronic control unit determines that the remote operation terminal device is operated by communication between the communication device and the remote operation terminal device, based on at least one of the information of targets acquired by the target information acquisition device and communication between the communication device and the remote operation terminal device, wherein the electronic control unit is configured to change recognizability of the road surface drawing according to at least one of a distance between the user of the vehicle and the vehicle, brightness around the vehicle and the number of operations on the remote operation terminal device such that the recognizability of the road surface drawing becomes higher as the distance between the user of the vehicle and the vehicle is larger, the recognizability of the road surface drawing becomes higher as the brightness around the vehicle is higher, and the recognizability of the road surface drawing becomes higher as the number of operations on the remote operation terminal device is larger.

2. The road surface drawing control device for a vehicle according to claim 1, wherein the electronic control unit is configured to operate a road surface drawing device to draw a road surface and operate hazard lamps of the vehicle, wherein the road surface drawing device includes at least one drawing unit that irradiates light of the road surface drawing, and the drawing unit is provided at a position different from the hazard lamps when viewed from above the vehicle.

3. The road surface drawing control device for a vehicle according to claim 1, wherein the electronic control unit is configured to operate the road surface drawing device to draw a road surface when the electronic control unit determines that the user of the vehicle is searching for the vehicle on the basis of at least one of the information of targets acquired by the target information acquisition device and the communication between the communication device and the remote operation terminal device.

4. The road surface drawing control device for a vehicle according to claim 1, wherein the road surface drawing device includes a plurality of drawing units that irradiate light of the road surface drawing in directions different from each other around the vehicle, and the electronic control unit is configured to determine a direction of the user of the vehicle with respect to the vehicle based on at least one of information of the targets acquired by the target information acquisition device and the communication between the communication device and the remote operation terminal device, and to determine a drawing unit to be operated based on the determined direction.

* * * * *